(12) United States Patent
Chang

(10) Patent No.: US 6,571,670 B2
(45) Date of Patent: Jun. 3, 2003

(54) SAFETY SHIELD FOR A MACHINING APPARATUS

(75) Inventor: Lu-Hsiung Chang, Feng-Yuan (TW)

(73) Assignee: Cyclematic Machinery Co., Ltd., Taichung Hsien (TW)

( * ) Notice: Subject to any disclaimer, the term of this patent is extended or adjusted under 35 U.S.C. 154(b) by 14 days.

(21) Appl. No.: 10/008,183

(22) Filed: Nov. 13, 2001

(65) Prior Publication Data

US 2003/0024358 A1 Feb. 6, 2003

(30) Foreign Application Priority Data

Aug. 6, 2001 (TW) ........................................ 090213324

(51) Int. Cl.[7] .............................. B23B 7/10; B23B 25/00
(52) U.S. Cl. .............................. 82/152; 82/173; 82/129; 82/118
(58) Field of Search ......................... 82/152, 173, 117, 82/142, 148, 149, 103, 104, 106, 108, 110, 112, 115, 118, 129

(56) References Cited

U.S. PATENT DOCUMENTS

| | | | | |
|---|---|---|---|---|
| 3,969,874 A | * | 7/1976 | Halcomb et al. | 53/567 |
| 4,034,633 A | * | 7/1977 | Petersen | 82/152 |
| 4,611,644 A | * | 9/1986 | Larson | 142/7 |
| 4,926,723 A | * | 5/1990 | Lothammer | 82/118 |
| 5,392,501 A | * | 2/1995 | Sonnek | 29/27 C |
| 5,597,023 A | * | 1/1997 | Heintzeman | 144/204.2 |
| 5,751,586 A | * | 5/1998 | Grabovac | 700/169 |

* cited by examiner

Primary Examiner—Henry W. H. Tsai
(74) Attorney, Agent, or Firm—Vinson & Elkins L.L.P.

(57) ABSTRACT

A safety shield for a machining apparatus includes a shield frame, and a curved shield member and a curved sliding door that are mounted on the shield frame to enclose a machining unit of the machining apparatus. The shield frame includes a rectangular base, a pair of lateral plates extending upwardly from the rectangular base, a top beam connected to top parts of the lateral plates, and a curved back plate having a top edge connected to the top beam, a bottom edge connected to a rear portion of the rectangular base, and a pair of curved lateral edges connected to the lateral plates, respectively. The shield member can be slid upward along a curved path to overlap the back plate, and the sliding door can be slid in the longitudinal direction of the rectangular base to permit access to the machining unit.

13 Claims, 8 Drawing Sheets

SAFETY SHIELD FOR A MACHINING APPARATUS

BACKGROUND OF THE INVENTION

1. Field of the Invention

The invention relates to a safety shield for a machining apparatus, more particularly to a safety shield that has a simple structure and permits easy access, and that greatly improves the safety of the working environment for a machining apparatus.

2. Description of the Related Art

Referring to FIG. 1, a conventional machining apparatus, such as a lathe, is shown to comprise a worktable 2 and a machining unit 1 mounted on the worktable 2. The machining unit 1 includes a plane stock 101, a lathe headstock 102, a tailstock 103, a cutter seat 104 and a numeric control device 105. The lathe headstock 102 is disposed at one end of the plane stock 101, whereas the tailstock 103 is disposed at the other end of the plane stock 101. The cutter seat 104 is mounted on the plane stock 101, and is movable in a longitudinal direction. The numeric control device 105 is mounted on an outer end of the tailstock 103. Hand wheels 106 are provided to control advancing and retreating movements of the cutter seat 104 during machining of a work piece (not shown) that is held between the headstock 102 and the tailstock 103.

The aforesaid conventional machining apparatus suffers from the following drawbacks: Through the digital control of the numeric control device 105 and the manual control of the hand wheels 106, a work piece can be tailored to achieve a designated shape via the movement of the cutter seat 104. Yet, as shown in FIG. 1, only a relatively small semicircular shield plate 107 is installed between the lathe headstock 102 and the tailstock 103 and is disposed near the lathe headstock 102 to prevent bits and pieces of the work piece from flying toward the operator. Apparently, the safety measure as such is not sufficient to provide adequate protection to the operator. Furthermore, no safety facility is provided to guard against injuries that can occur when the operator or other objects come into accidental contact with operating components of the lathe during a cutting operation. By the same token, other types of machining apparatus, such as planing machines, milling machines, grinding machines and drilling machines, are also susceptible to the same problems.

SUMMARY OF THE INVENTION

Therefore, the object of the present invention is to provide a safety shield for a machining apparatus to overcome the aforesaid drawbacks of the prior art.

Accordingly, the safety shield of the present invention is applied to a machining apparatus that includes a worktable and a machining unit mounted on the worktable. The safety shield comprises a shield frame, at least one curved shield member, and at least one curved sliding door.

The shield frame includes: a rectangular base adapted to be mounted on the worktable and having front and rear portions that extend in a longitudinal direction, and left and right portions that extend in a transverse direction, that interconnect the front and rear portions, and that cooperate with the front and rear portions to define an opening for permitting the machining unit to extend upwardly through the rectangular base; a pair of lateral plates extending upwardly from the rectangular base, each of the lateral plates having a base part disposed to extend in the transverse direction and connected to a respective one of the left and right portions of the rectangular base, and a top part opposite to the base part in an upright direction; a top beam disposed to extend in the longitudinal direction and having opposite ends connected to the top parts of the lateral plates, respectively; and a curved back plate having a top edge connected to the top beam, a bottom edge connected to the rear portion of the rectangular base, and a pair of curved lateral edges that interconnect the top and bottom edges and that are connected to the lateral plates, respectively.

Each shield member has a first curved lateral portion connected slidably to an adjacent one of the lateral plates so as to be slideable along a curved path between a first position, where the shield member extends between the top beam and the front portion of the rectangular base, and a second position, where the shield member extends between the top beam and the rear portion of the rectangular base and is disposed to overlap the back plate.

Each sliding door has an upper edge that is slidable along the top beam, and a lower edge that is slidable along the front portion of the rectangular base. The sliding door has a length in the longitudinal direction that is less than a length of the rectangular base in the longitudinal direction.

Since the safety shield of the present invention forms an enclosure for the machining unit of the machining apparatus, bits and pieces of a work piece can be retained inside the safety shield during operation of the machining unit. In addition, accidental contact by people or other objects with the operating components of the machining unit can be avoided. Thus, the safety of the working environment can be greatly enhanced.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 4:
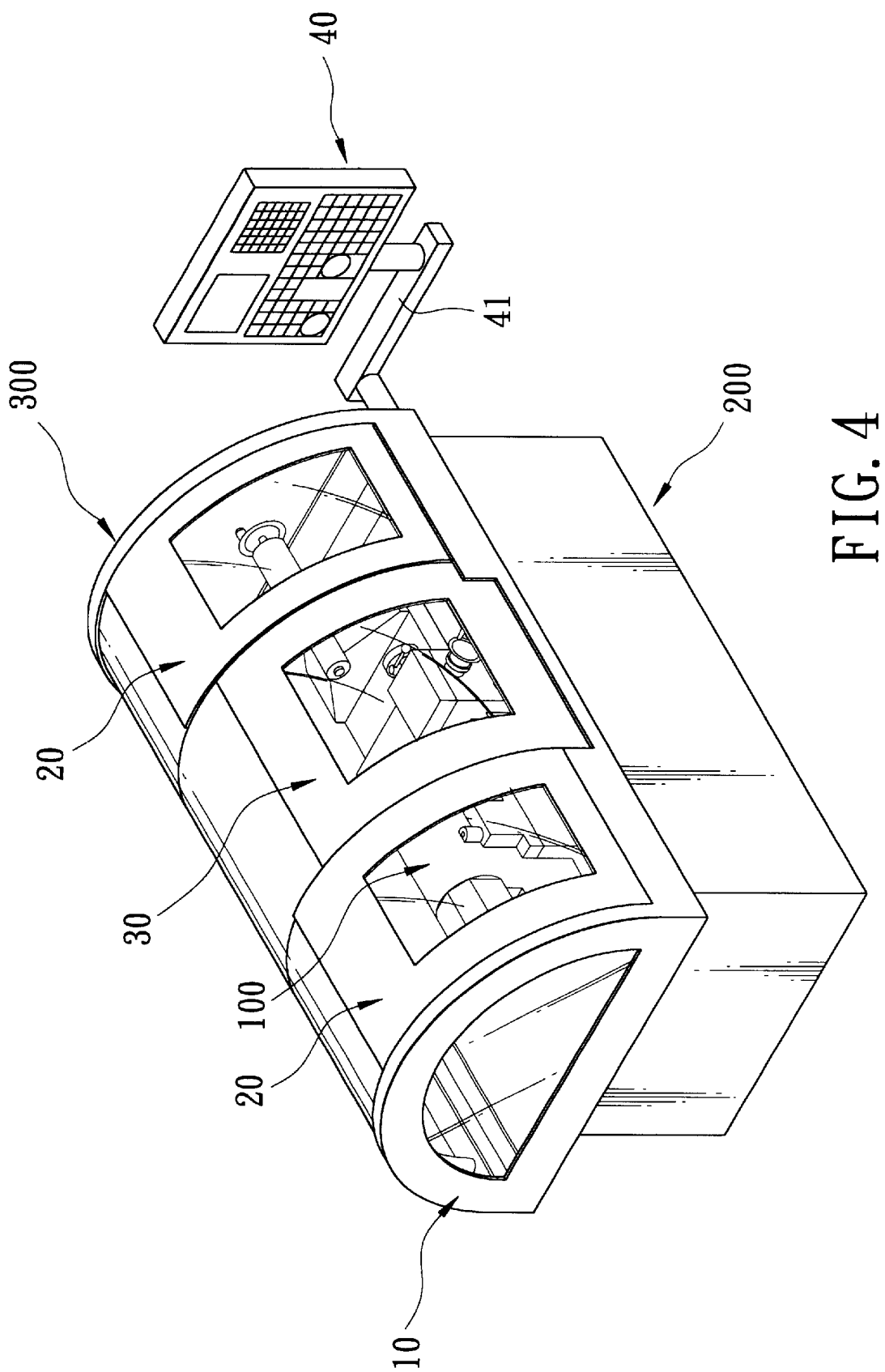
FIG. 4 is a perspective view of the first preferred embodiment in a fully closed state.

Referring to FIG. 4, the first preferred embodiment of a safety shield 300 according to the present invention is shown to be applied to a machining apparatus, such as a lathe, having a worktable 200 and a machining unit 100 mounted on the worktable 200. The safety shield 300 is mounted on the worktable 200 so as to cover top, front, rear, left and right sides of the machining unit 100. The safety shield 300 includes a shield frame 10, a pair of shield members 20 and a sliding door 30.

Figure 1:
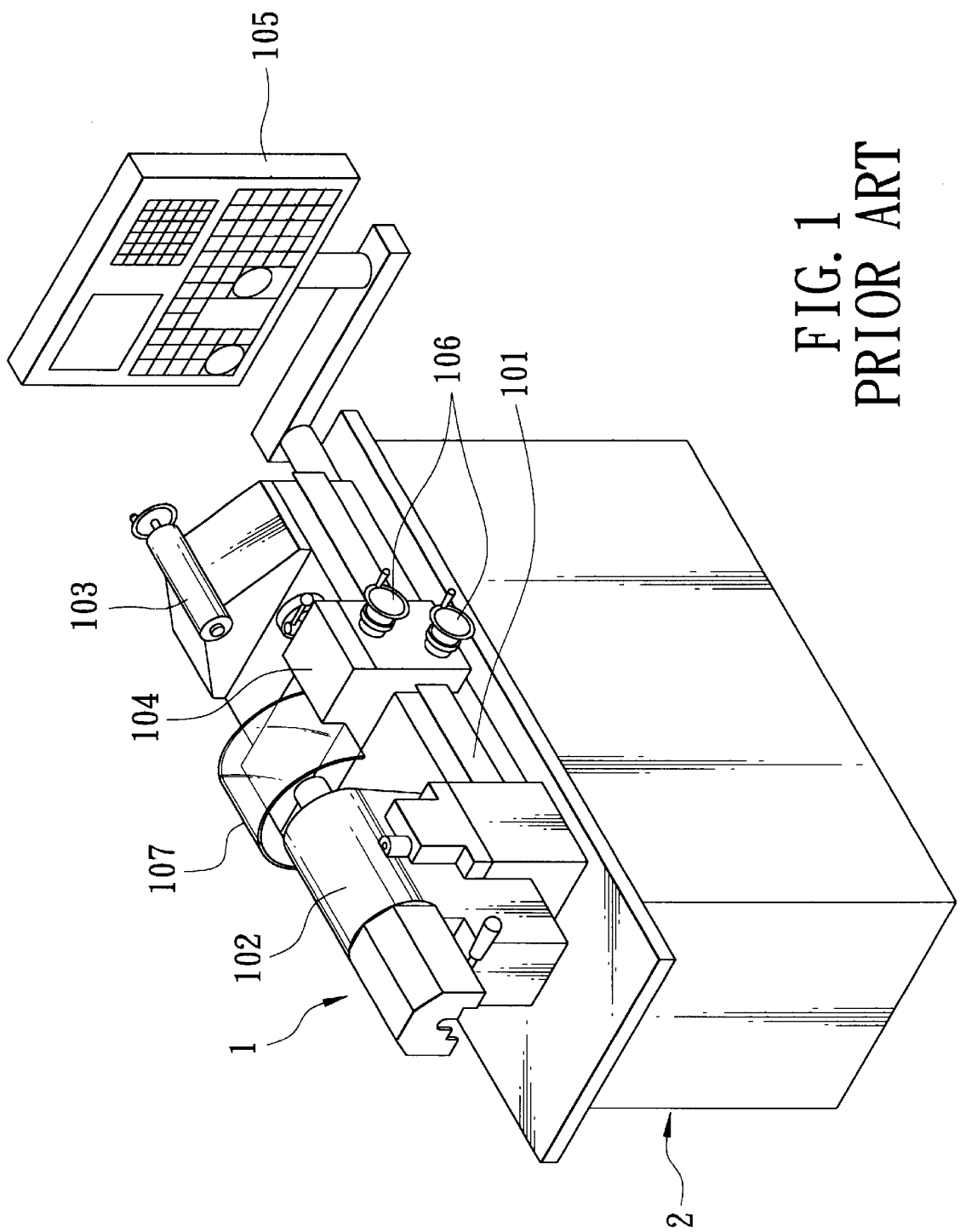
FIG. 1 is an exploded perspective view of a conventional machining apparatus.
Figure 2:
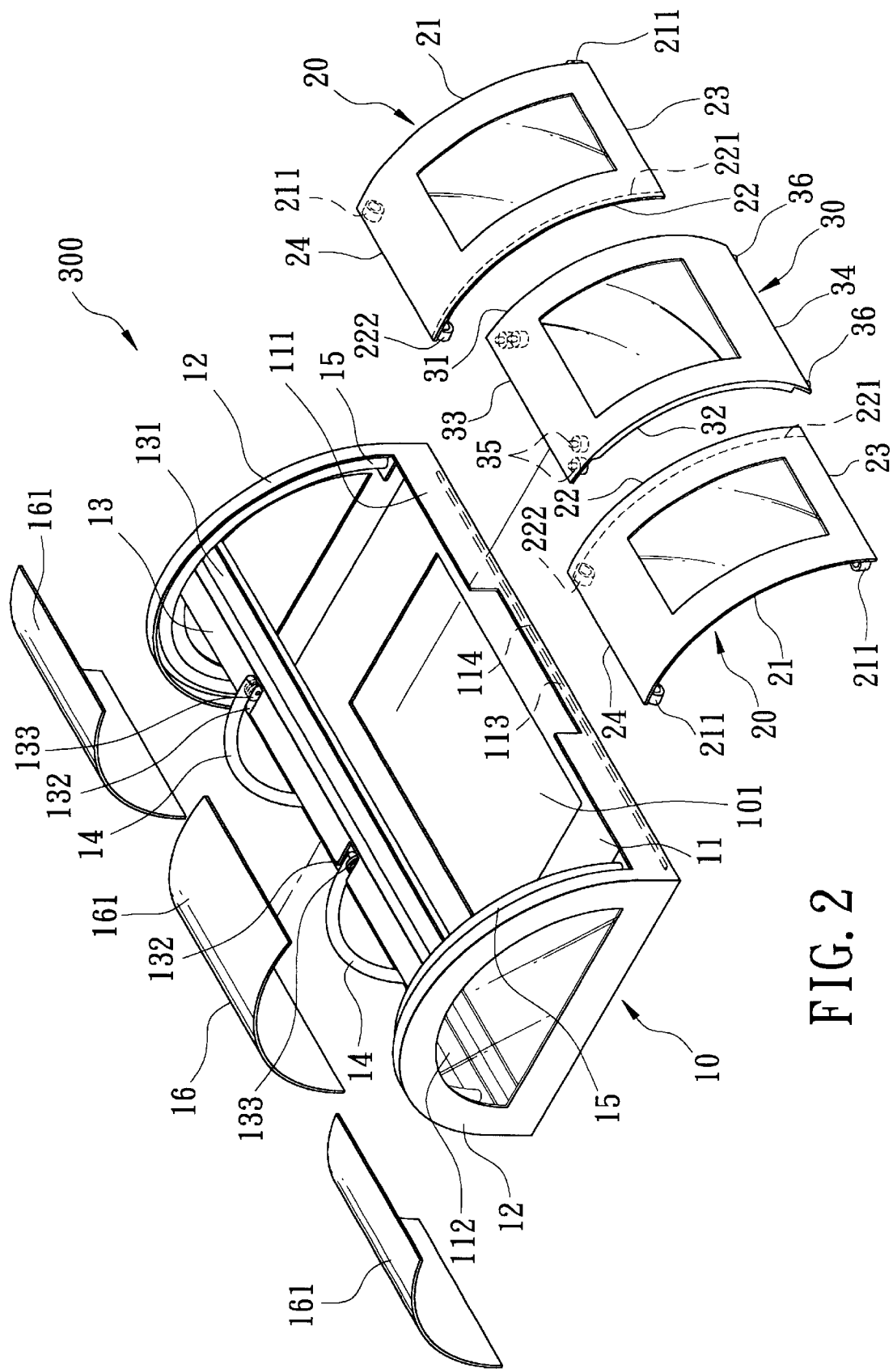
FIG. 2 is an exploded perspective view of the first preferred embodiment of the safety shield for a machining apparatus according to the present invention.
Figure 3:
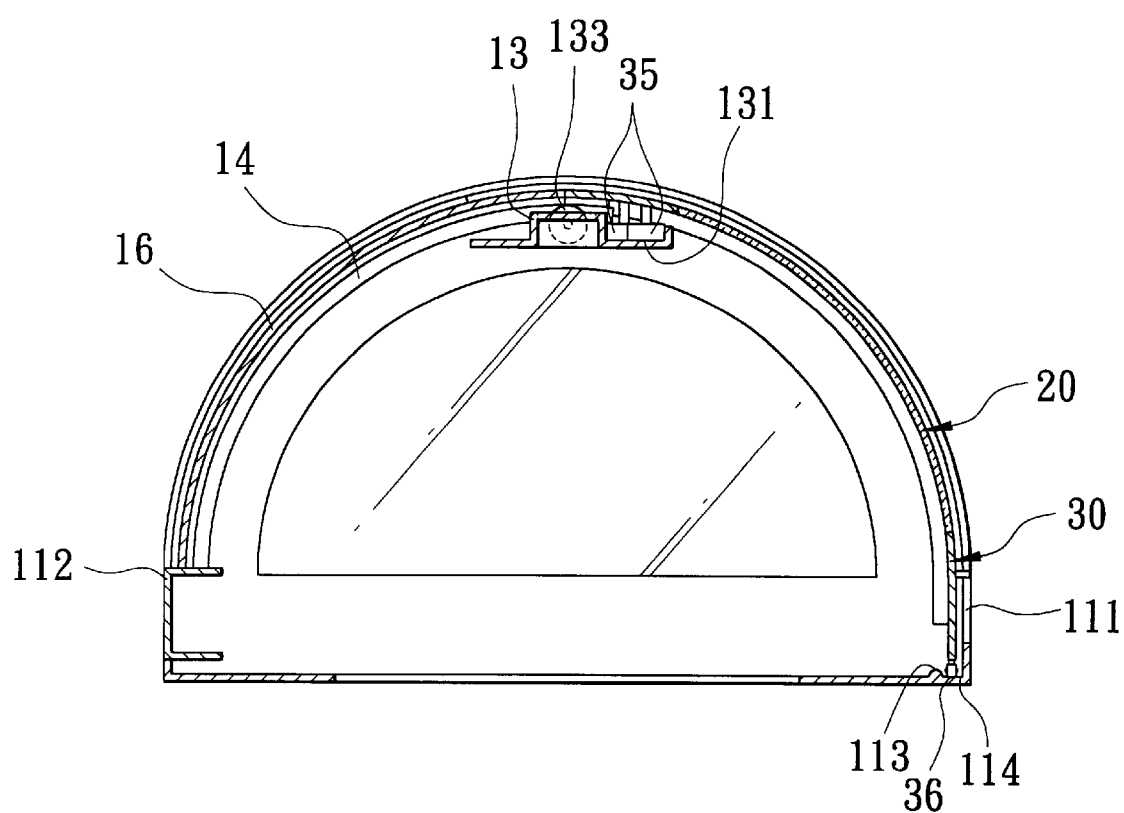
FIG. 3 is a sectional view of the first preferred embodiment.

Referring to FIGS. 2 and 3, the shield frame 300 comprises a rectangular base 11, a pair of lateral plates 12, a top beam 13, a pair of curved support rails 14, a pair of curved guide rails 15 and a curved back plate 16.

The rectangular base 11 has a peripheral portion adapted to be mounted on the periphery of the worktable 200, and has front and rear portions that extend in a longitudinal direction, and left and right portions that extend in a transverse direction, that interconnect the front and rear portions, that are shorter than the front and rear portions, and that cooperate with the front and rear portions to define an opening 101 for permitting the machining unit 100 to extend upwardly through the rectangular base 11. A front barrier 111 extends upwardly from the front portion of the rectangular base 11, whereas a rear barrier 112 extends upwardly from the rear portion of the rectangular base 11. A lower door rail 113 is disposed proximate to the front barrier 111, extends in the longitudinal direction on the rectangular base 11, and cooperates with the front barrier 111 to form a sliding groove 114.

Each of the lateral plates 12 is semicircular in shape, and extends upwardly from the rectangular base 11. Each of the lateral plates 12 has a base part disposed to extend in the transverse direction and connected to a respective one of the left and right portions of the rectangular base 11, and a top part opposite to the base part in an upright direction. The front and rear barriers 111, 112 have opposite ends connected respectively to curved peripheral edges of the lateral plates 12.

The top beam 13 is disposed to extend in the longitudinal direction above the machining unit 100 (see FIG. 4), and has opposite ends connected to the top parts of the lateral plates 12, respectively. The top beam 13 has a front part formed with an upper door rail 131 that extends in the longitudinal direction. A rear part of the top beam 13 is divided by a pair of retaining grooves 132 into three equal segments. Each of the retaining grooves 132 has a guide roller 133 that is retained therein and that protrudes relative to a top surface of the top beam 13.

Each of the support rails 14, which has a 90-degree arc length, further has a top end straddling over one of the retaining grooves 132 and fixedly disposed beside one of the guide rollers 133 on the top beam 11, and a bottom end fixedly disposed at one-third-length and two-third-length points of the rear barrier 112, respectively.

Each of the guide rails 15, which is semicircular in shape, extends along the curved peripheral edge of a respective one of the lateral plates 12, and has one end fixedly disposed at the front barrier 111, and the other end fixedly disposed at the rear barrier 112.

The back plate 16 has a top edge connected fixedly to the top beam 13, a bottom edge connected fixedly to the rear barrier 112, and a pair of curved lateral edges that interconnect the top and bottom edges and that are connected to the lateral plates 12, respectively. Each of the curved lateral edges of the back plate 16 has a 90-degree arc length. In this embodiment, the curved back plate 16 is formed from three curved acrylic plastic plates 161 that are disposed side by side.

Each of the shield members 20, which has a 90-degree arc length, further has a front edge 23 and a rear edge 24 that extend in a longitudinal direction, and a pair of curved lateral portions 21, 22 that interconnect the front and rear edges 23, 24. In this embodiment, the length of the front and rear edges 23, 24 of each shield member 20 is one third of that of the top beam 13. The shield members 20 are disposed between the lateral plates 12. A pair of guide sleeves 211 are disposed respectively at opposite ends of the lateral portion 21. The guide sleeves 211 are sleeved on the guide rail 15 of an adjacent one of the lateral plates 12 to guide sliding movement of the shield member 20 relative to the adjacent one of the lateral plates 12. A guide strip 221 extends along the lateral portion 22 and is in rolling contact with and is slidably supported by one of the guide rollers 133 on the top beam 13 to further guide sliding movement of the shield member 20. A guide sleeve 222 is disposed at one end of the lateral portion 22 and is sleeved slidably on one of the support rails 14. By the cooperation of the guide sleeves 211, 221, the guide rails 15, the support rails 14, the guide strips 221 and the guide rollers 133, each of the shield members 20 can slide along a curved path between a first position, where the shield member 20 extends between the top beam 13 and the front barrier 111 of the rectangular base 11 to configure the safety shield 300 into a semi-cylindrical enclosure (see FIG. 4), and a second position, where the shield member 20 extends between the top beam 13 and the rear barrier 112 of the rectangular base 11 and is disposed to overlap the back plate 16 (see FIG. 6).

The sliding door 30, which has a 90-degree arc length, further has a lower edge 34 and an upper edge 33 that extend in the longitudinal direction, and a pair of curved lateral edges 31, 32 that interconnect the lower and upper edges 34, 33. The length of the lower and upper edges 34, 33 is one third of that of the top beam 13. A pair of roller units 35 are disposed at the upper edge 33 and slidably engage the upper door rail 131 of the top beam 13. A pair of rollers 36 are disposed at the lower edge 34 and slidably engage the sliding groove 114 of the lower door rail 113 of the rectangular base 11. By the cooperation of the roller units 35 and the rollers 36, the sliding door 30 can be slid in the longitudinal direction for denying access into the semi-cylindrical enclosure, as shown in FIG. 4, where the lateral edges 31, 32 of the sliding door 30 are proximate to the lateral portion 22 of the shield members 20, or for permitting access into the semi-cylindrical enclosure, as shown in FIGS. 5 and 6.

Referring to FIG. 4, since the safety shield 300 forms an enclosure for the machining unit 100, a numeric control device 40 is connected to the machining unit 100 via a connecting bar 41 to control operation of the machining unit 100. The connecting bar 41 has one end connected to a bottom end of the numeric control device 40, and the other end extending through the safety shield 300 and connected to the machining unit 100. Due to the arrangement of the safety shield 300, during operation of the machining unit 100, the bits and pieces of the work piece can be retained inside the safety shield 300. Moreover, accidental contact by people or other objects with the operating components of the machining unit 100 can be avoided.

Figure 5:
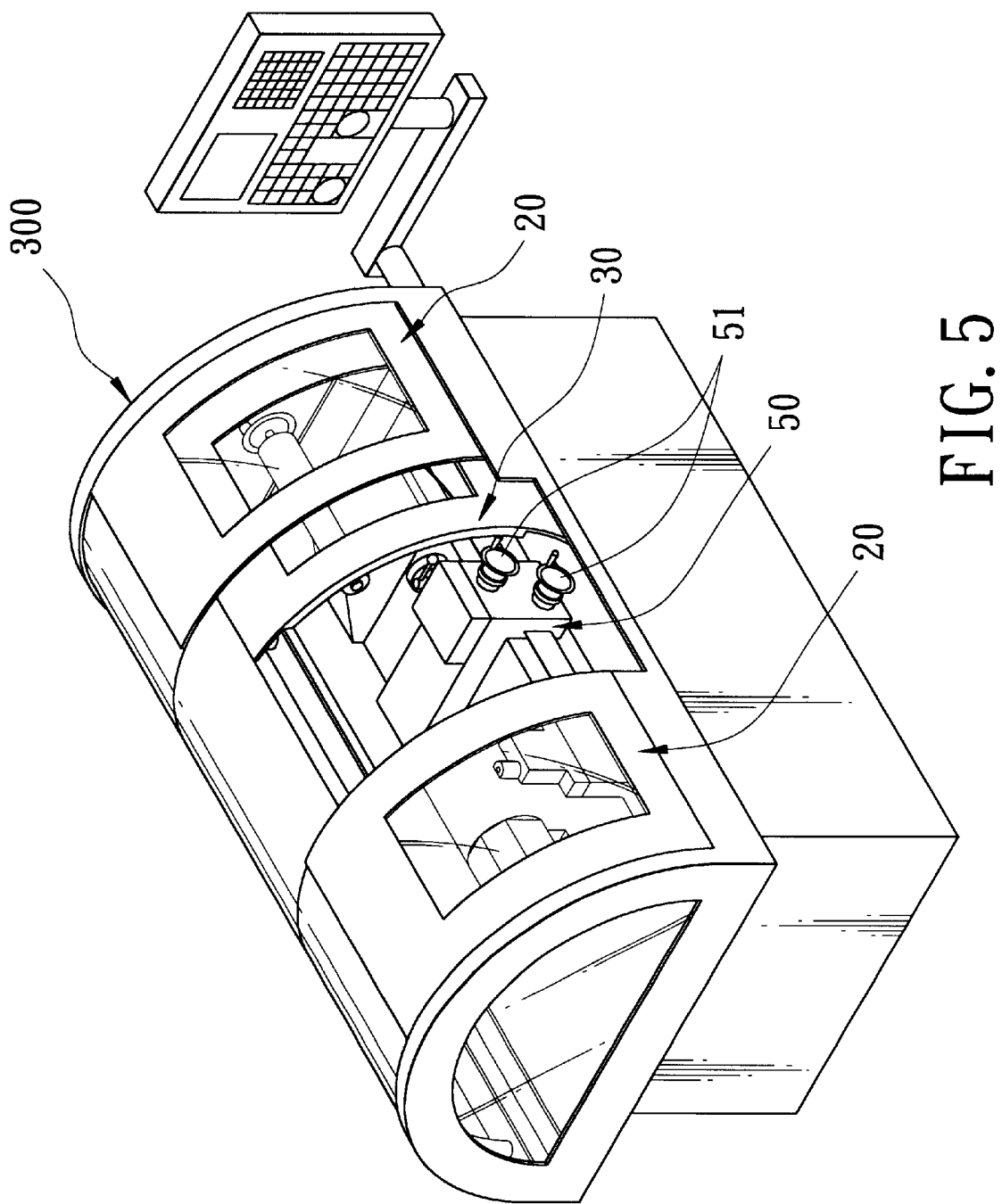
FIG. 5 is another perspective view of the first preferred embodiment with a sliding door thereof in an opened state.

Referring to FIG. 5, during the machining operation, if it is necessary to manually control two hand wheels 51 disposed on a cutter seat 50 that is mounted at an intermediate section of the machining unit 100 so as to control the advancing and retreating movements of the cutter seat 50, the sliding door 30 of the safety shield 300 can be slid in the longitudinal direction so as to permit access to the hand wheels 51, while the rest of the operating components of the machining unit 100 remain shielded by other parts of the safety shield 300. As such, the safety shield 300 provides sufficient protection to the operator.

Figure 6:
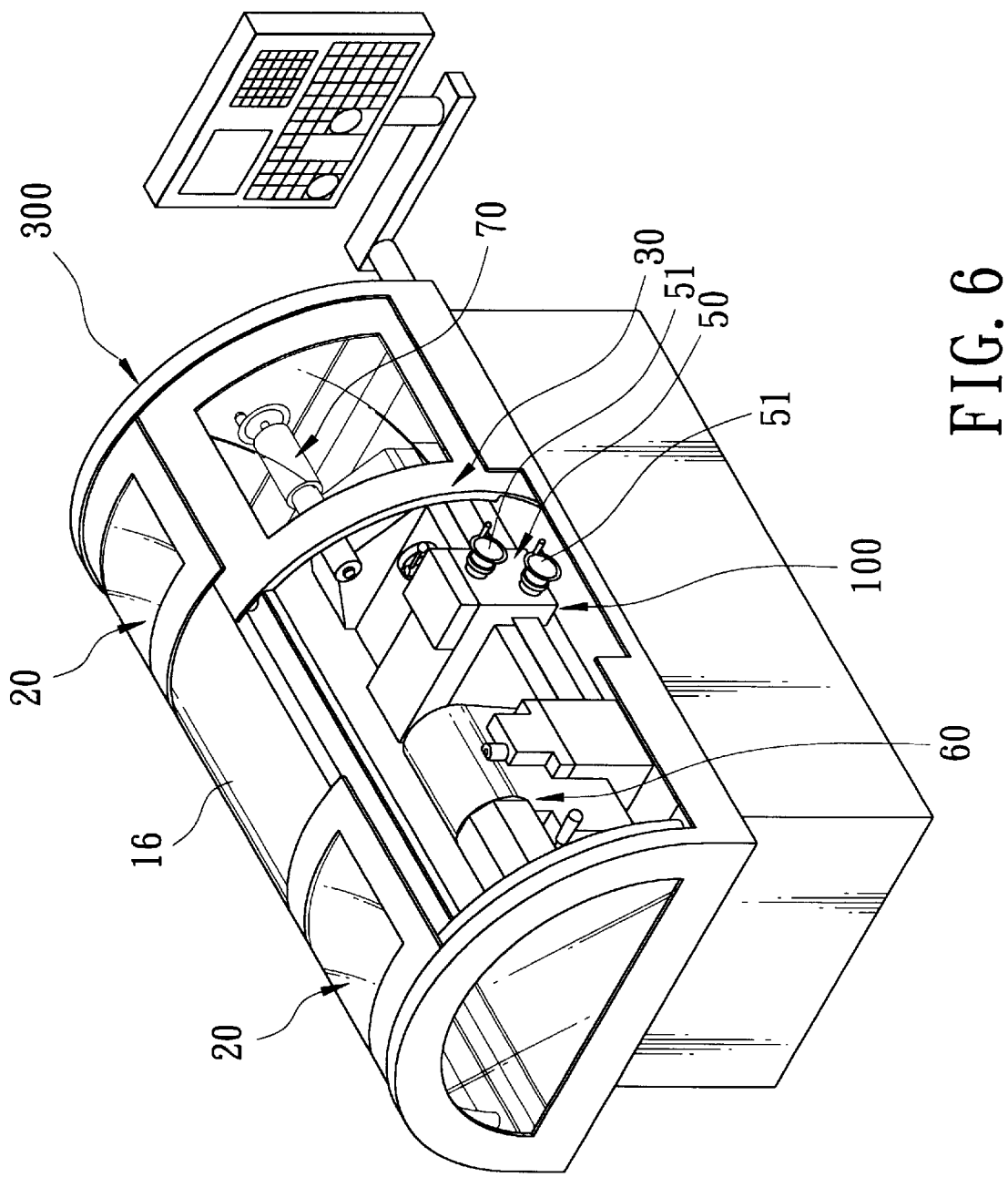
FIG. 6 is yet another perspective view of the first preferred embodiment with the sliding door and two shield members thereof in an opened state.

Referring to FIG. 6, when it is desired to mount a work piece (not shown) on the machining unit 100 for machining or to remove the same therefrom, the two shield members 20 of the safety shield 300 can be slid to the second position such that the shield members 20 overlap the back plate 16 of the shield frame 10, and the sliding door 30 can be slid in the longitudinal direction toward one of the lateral plates 12. As such, there will be sufficient space for the operator to mount the work piece on the machining unit 100 or remove the same therefrom.

In the present invention, as access to a lathe headstock 60 and a tailstock 70, which are respectively disposed at left and right end portions of the machining unit 100, is necessary only during mounting or removal of the work piece, the shield members 20 are configured so that they can be slidably pushed upwardly to the second position to overlap the back plate 16 so as to permit access to the left and right end portions of the machining unit 100. Although a relatively large force is required to push the shield members 20 upwardly, such a configuration provides a relatively large access opening for the operator to access the lathe headstock 60 and tailstock 70. On the other hand, as operation of the hand wheels 51 disposed at the intermediate section of the machining unit 100 is relatively frequent, the sliding door 30 which is disposed to shield the hand wheels 51 is configured to be slidable in the longitudinal direction to facilitate pushing thereof.

Figure 7:
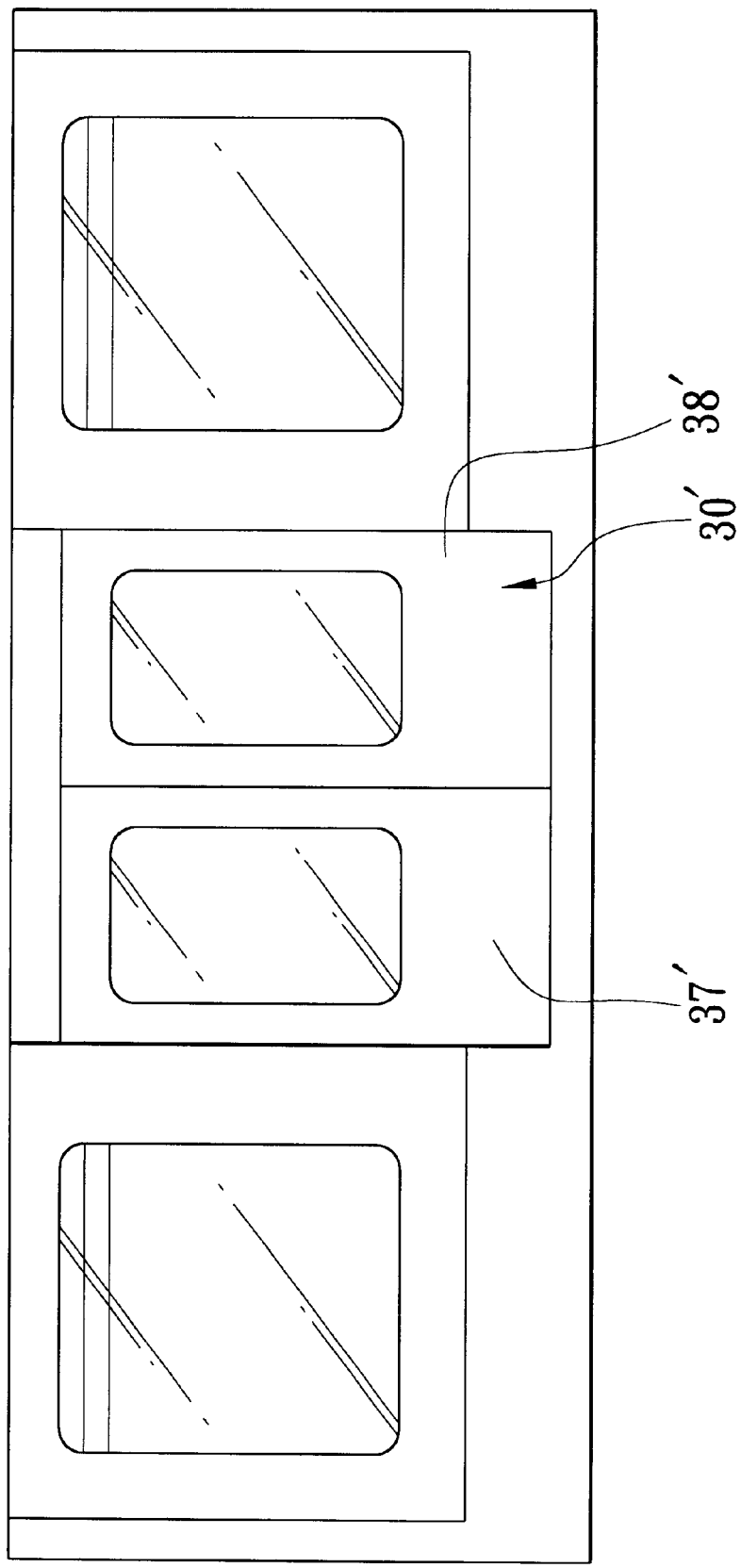
FIG. 7 is a schematic front view of the second preferred embodiment of the safety shield for a machining apparatus according to the present invention.
Figure 8:
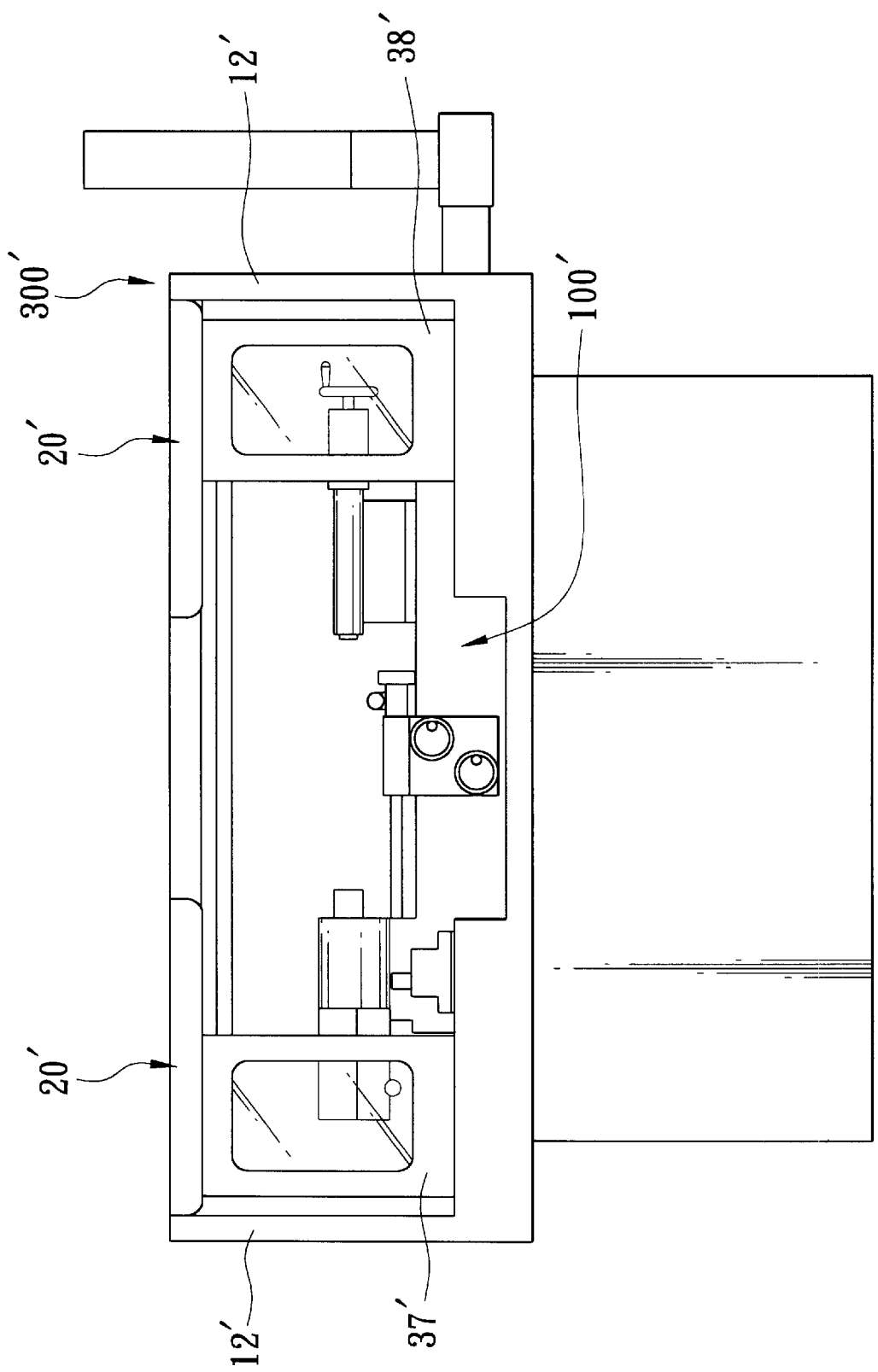
FIG. 8 is a schematic front view of the second preferred embodiment with two sliding doors and two shield members thereof in an opened state.

FIG. 7 shows the second preferred embodiment of a safety shield according to the present invention. As shown, a sliding door 30' includes left and right door panels 37', 38', which are slidable in the longitudinal direction. Referring to FIG. 8, when two shield members 20' are slid upward to a second position to permit access to a machining unit 100', the left and right door panels 37', 38' can be slid in the longitudinal direction to abut against two lateral plates 12' of a shield frame 300', respectively, thereby forming a relatively large access opening into an intermediate portion of the machining unit to facilitate mounting or removal of a work piece, or maintenance of the machining unit 100'.

It is noted that this invention can also be applied to other types of machining apparatuses, such as planing lathes, milling machines, grinding machines, drilling machines, etc., to provide an enclosure for the machining unit so that bits and pieces of a work piece can be retained inside the safety shield during operation of the machining unit. In addition, accidental contact by people or other objects with the operating components of the machining unit can be avoided to thereby ensure the safety of the working environment.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A safety shield for a machining apparatus, the machining apparatus including a worktable and a machining unit mounted on the worktable, said safety shield comprising:
   a shield frame including
      a rectangular base adapted to be mounted on the worktable and having front and rear portions that extend in a longitudinal direction, and left and right portions that extend in a transverse direction, that interconnect said front and rear portions, and that cooperate with said front and rear portions to define an opening for permitting the machining unit to extend upwardly through said rectangular base,
      a pair of lateral plates extending upwardly from said rectangular base, each of said lateral plates having a base part disposed to extend in the transverse direction and connected to a respective one of said left and right portions of said rectangular base, and a top part opposite to said base part in an upright direction,
      a top beam disposed to extend in the longitudinal direction and having opposite ends connected to said top parts of said lateral plates, respectively, and
      a curved back plate having a top edge connected to said top beam, a bottom edge connected to said rear portion of said rectangular base, and a pair of curved lateral edges that interconnect said top and bottom edges and that are connected to said lateral plates, respectively;
   at least one curved shield member having a first curved lateral portion connected slidably to an adjacent one of said lateral plates so as to be slidable along a curved path between a first position, where said shield member extends between said top beam and said front portion of said rectangular base, and a second position, where said shield member extends between said top beam and said rear portion of said rectangular base and is disposed to overlap said back plate; and
   at least one curved sliding door having an upper edge that is slidable along said top beam, and a lower edge that is slidable along said front portion of said rectangular base, said sliding door having a length in the longitudinal direction that is less than a length of said rectangular base in the longitudinal direction.

2. The safety shield of claim 1, wherein said front and rear potions of said rectangular base are longer than said left and right portions.

3. The safety shield of claim 1, wherein said curved lateral edges of said back plate have a 90-degree arc length.

4. The safety shield of claim 1, wherein each of said shield member and said sliding door have a 90-degree arc length.

5. The safety shield of claim 1, comprising two of said shield members connected slidably and respectively to said lateral plates, each of said shield members having a length in the longitudinal direction that is about one third of the length of said rectangular base in the longitudinal direction, the length of said sliding door in the longitudinal direction being about one third of that of said rectangular base.

6. The safety shield of claim 1, wherein at least one of said lateral plates has a curved peripheral edge and a curved guide rail extending along said curved peripheral edge, said first curved lateral portion of said shield member being provided with at least one guide sleeve that is sleeved on said guide rail on the adjacent one of said lateral plates to guide sliding movement of said shield member.

7. The safety shield of claim 1, wherein said shield member further has a second curved lateral portion opposite to said first curved lateral portion in the longitudinal direction, said top beam being provided with a guide roller for slidably supporting said second curved lateral portion of said shield member.

8. The safety shield of claim 1, wherein said rectangular base is formed with a lower door rail that extends in the longitudinal direction and that is disposed adjacent to said front portion, said lower edge of said sliding door being in sliding engagement with said lower door rail.

9. The safety shield of claim 8, wherein said lower door rail is formed as a groove, and said lower edge of said sliding door is provided with a roller unit that extends into said groove.

10. The safety shield of claim 1, wherein said top beam is formed with an upper door rail that extends in the longitudinal direction, said upper edge of said sliding door being in sliding engagement with said upper door rail.

11. The safety shield of claim 10, wherein said upper door rail is formed as a groove, and said upper edge of said sliding door is provided with a roller unit that is in sliding engagement with said upper door rail.

12. The safety shield of claim 1, wherein said backplate is made of acrylic plastic.

13. The safety shield of claim 1, wherein said sliding door includes left and right door panels.

* * * * *